(No Model.)
G. MIOT.
DYNAMO ELECTRIC MACHINERY.
No. 386,340. Patented July 17, 1888.
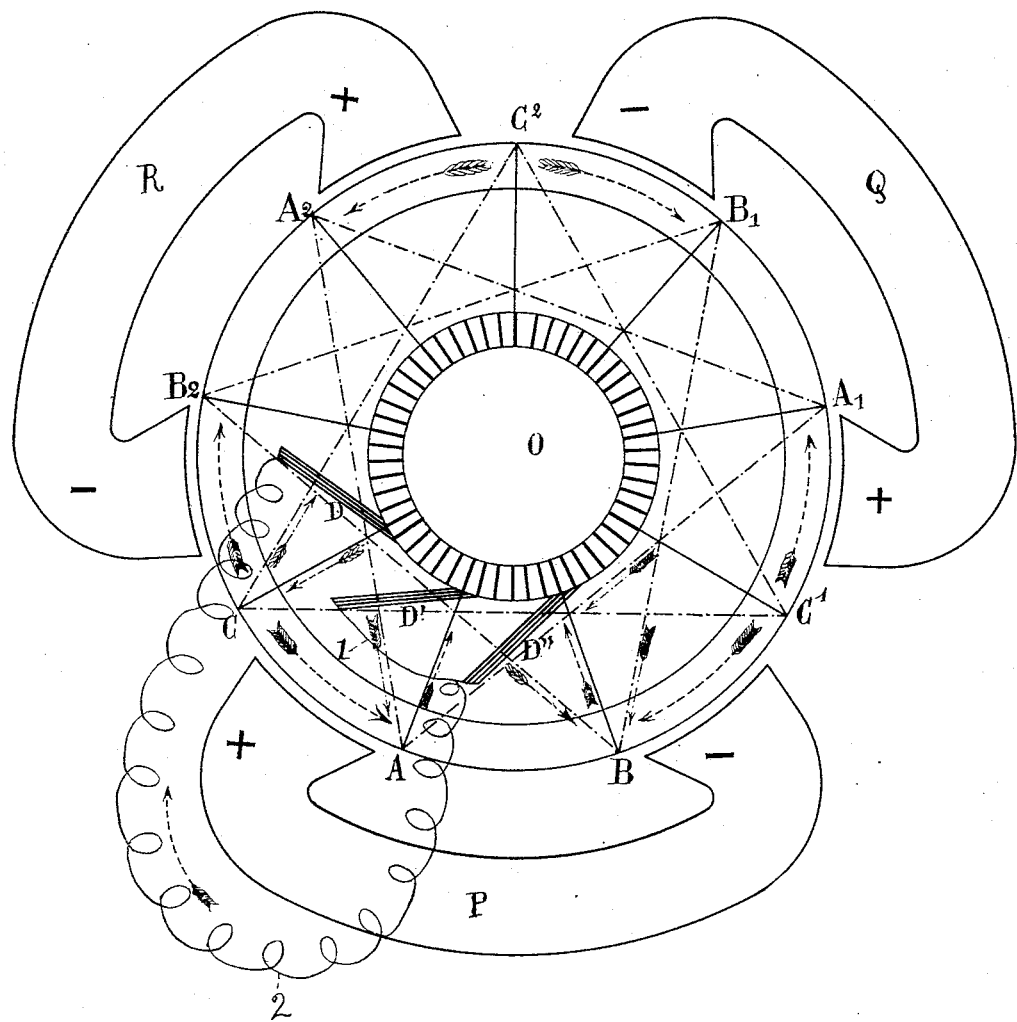

UNITED STATES PATENT OFFICE.

GEORGES MIOT, OF PARIS, FRANCE.

DYNAMO-ELECTRIC MACHINERY.

SPECIFICATION forming part of Letters Patent No. 386,340, dated July 17, 1888.

Application filed March 14, 1888. Serial No. 267,136. (No model.) Patented in France December 5, 1887, No. 187,403, and in Belgium September 3, 1887, No. 78,768.

*To all whom it may concern:*

Be it known that I, GEORGES MIOT, of Paris, in the Republic of France, have invented a new and useful Improvement in Multipolar Dynamo-Electric Machines, (which has been patented in France by Letters Patent No. 187,403, dated December 5, 1887, and in Belgium by Letters Patent No. 78,768, dated September 3, 1887,) which is fully set forth in the following specification.

This invention relates to multipolar dynamo-electric machines; and it consists in certain constructions or arrangements of the field-magnets and commutator-brushes, which can most conveniently be described in connection with the accompanying drawing, which is a diagram of a dynamo-electric machine constructed in accordance with the invention.

The armature O is or may be of ordinary ring form, having cross connections such as common in multipolar dynamos for connecting in parallel or multiple arc the coils or bobbins which occupy like positions in the magnetic field.

The field-magnets P Q R are arranged around the armature with the unlike poles which belong to two neighboring magnets nearer together than those which belong to the same magnet. Thus, as shown, the minus (—) pole of the magnet Q is nearer the plus (+) pole of the neighboring magnet R than it is to the plus (+) pole of its own magnet Q, and so of the other magnetic poles. The magnets used have simple instead of consequent poles, and are provided with suitable polar enlargements. It is this arrangement of the electro-inducing or field magnets with unequally-spaced simple poles which constitutes the principal feature of invention. By this arrangement the length of the magnets can be increased and a stronger field produced than if the poles were equally spaced. It is found that the unlike poles of neighboring magnets can be brought very close together (in fact, almost into contact) without weakening the magnetic field, as I have determined by exploration with the inductometer described in my application of March 7, 1888, Serial No. 266,480. The field-magnets can therefore be given the greatest length compatible with the diameter of the armature, and the enlarged pole-pieces may be given the form most appropriate to the full utilization of the magnetic force produced by the excitation of the field-magnets for which electro-magnets are or would ordinarily be employed.

The invention is not restricted to any particular distance between the magnetic poles nor to any particular number of magnets. The field-magnets and armature may be supported in any known or suitable way. The current, also, may be taken from (or supplied to) the armature by any suitable means. It is preferred, however, to employ the following arrangement of brushes or rubbers, which forms a special feature of the invention—that is to say, a brush, D, is placed between the poles of the neighboring magnets (between P and R, as shown) and two brushes, D′ D″, which are electrically connected, (as by wire 1,) are placed at different points between the poles of the same magnet or magnets, so as to cut out by short-circuiting the idle coils or bobbins of the armature. As shown, the two brushes D′ D″ are placed between the poles of the same field-magnet, (namely, the magnet P;) but they could be placed between the poles of different magnets, since all the coils which occupy like positions in the magnetic field are connected with each other, as common in multipolar dynamos. Instead, therefore, of bearing upon the commutator opposite the point A, the brush D′ could be placed at a corresponding point near any of the + poles—as, for example, at A, A′, or A²; and the brush D″ could be placed at B, B′, or B². The effect of the cross-connections in putting these points in electrical connection with each other is illustrated by the broken lines.

The external circuit, 2, extends from the brushes D′ D″ as one pole to the brush D as the other pole of the dynamo.

The zones between the points A B A′ B′ A² B² being magnetically neutral, no current is generated in the coils occupying these zones, and such coils may therefore be cut out, and the loss of energy due to their resistance thus avoided. The arrows indicate the direction of the currents in the armature and external circuit.

The improved dynamo may be used for the purposes and in the manner for or in which dynamos in general have been or are employed.

By having the commutator-brushes placed between certain poles it is to be understood that they bear upon the commutator-strips connected with the armature-coils between such poles.

I claim as my invention or discovery—

1. In a multipolar dynamo and in combination with the armature thereof, a series of field-magnets with simple magnetic poles arranged about the said armature with the several poles or enlarged polar extremities nearer to a pole or enlarged polar extremity of unlike sign of a neighboring magnet than to the other pole or enlarged polar extremity of its own magnet, substantially as described.

2. In combination with the cross-connected armature of a multipolar dynamo and the field-magnets arranged about said armature, with the several magnetic poles nearer to an unlike pole of a neighboring magnet than to the unlike pole of its own magnet, the commutator-brushes consisting of a brush arranged between the poles of neighboring magnets and two electrically-connected brushes arranged at different points between the poles of the same magnet or magnets, substantially as described.

In testimony whereof I have signed this specification in the presence of two subscribing witnesses.

GEORGES MIOT.

Witnesses:
V. BIDANT,
J. DUPONT.